United States Patent
Tripp et al.

(10) Patent No.: US 7,548,969 B2
(45) Date of Patent: Jun. 16, 2009

(54) COMPUTER SYSTEM POLLING WITH ADJUSTABLE INTERVALS BASED ON RULES AND SERVER STATES

(75) Inventors: Travis Scott Tripp, Ft. Collins, CO (US); Phil A. Flocken, Denver, CO (US); Yassine Faihe, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 707 days.

(21) Appl. No.: 11/190,319

(22) Filed: Jul. 27, 2005

(65) Prior Publication Data

US 2007/0027987 A1    Feb. 1, 2007

(51) Int. Cl.
*G06F 15/173* (2006.01)
*G06F 17/00* (2006.01)
*G06F 11/00* (2006.01)

(52) U.S. Cl. ............... 709/223; 709/225; 707/100; 370/252

(58) Field of Classification Search ............. None
See application file for complete search history.

(56) References Cited

U.S. PATENT DOCUMENTS

| | | | |
|---|---|---|---|
| 4,071,908 A | 1/1978 | Brophy et al. | |
| 5,563,874 A * | 10/1996 | Kant | 370/252 |
| 6,101,541 A * | 8/2000 | Ellesson et al. | 709/225 |
| 6,173,323 B1 | 1/2001 | Moghe | |
| 6,353,869 B1 | 3/2002 | Ofer et al. | |
| 6,744,780 B1 | 6/2004 | Gu et al. | |
| 6,791,998 B1 | 9/2004 | Yoshihara et al. | |
| 2002/0087692 A1* | 7/2002 | Woods et al. | 709/225 |
| 2002/0112040 A1* | 8/2002 | Chang et al. | 709/223 |
| 2004/0236820 A1 | 11/2004 | Flocken | |
| 2004/0249914 A1 | 12/2004 | Flocken et al. | |
| 2005/0164703 A1* | 7/2005 | Huynh | 455/432.3 |
| 2006/0021023 A1* | 1/2006 | Stewart et al. | 726/17 |
| 2006/0282521 A1* | 12/2006 | Anderson et al. | 709/223 |
| 2008/0098014 A1* | 4/2008 | Eichstaedt et al. | 707/100 |

* cited by examiner

*Primary Examiner*—Wen-Tai Lin

(57) ABSTRACT

Polling is disclosed. A client rule set, associated with a service level, is provided. Based upon the client rule set, a polling interval for a request type is determined. A message associated with the request type is provided, and a server is polled with the message in accordance with the polling interval. A response to the message is received, and the polling interval is adjusted.

21 Claims, 4 Drawing Sheets

COMPUTER SYSTEM POLLING WITH ADJUSTABLE INTERVALS BASED ON RULES AND SERVER STATES

BACKGROUND

Client-server systems are very common in today's technological environment. In some cases, a client-server system may be deployed across customer boundaries; that is, the server is operated by a vendor, and the client is operated by a customer of the vendor. In these situations, the server may need to send a message to the client, but the customer site where the client resides may not allow an open port for inbound messages due to the security risk involved. This is often addressed by having the client poll the server for new messages from the server. In other words, the client pulls information from the server, rather than permitting the server to push information to the client.

Where a client desires to pull messages from the server and to react to such messages in a timely manner, the client may typically be configured to poll the server frequently. This can cause unwanted network traffic and server load, slowing down the performance of the client-server system. Many times, the client polls the server and the server has no message for the client. Therefore, the network and computing performance degradation is caused primarily by wasted communications.

Such performance degradation is especially problematic in situations where a vendor provides a remote service to a set of customers and that vendor needs to be able to both scale and provide varying degrees of service levels to the vendor's customers according to a service level agreement ("SLA"). The problem is further complicated by the fact that a vendor's remote services may vary and may require multiple simultaneous types of polling.

Traditional solutions involve a set interval by which the client will periodically poll the server for new messages. This type of static polling results in wasted network communications, since the server may not typically have a message to send to the client. If a substantial number of clients communicate with one server in this manner, the server will be unnecessarily loaded and the performance between the clients and the server will degrade.

Handling client server polling efficiently is often addressed through the usage of adaptive polling. Adaptive polling is a concept where the polling is regulated in a way to efficiently handle the communication between a client and a server. Existing solutions have not attempted to address dynamic handling of customers differently based upon both the message types and the customers' service level agreements.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

Overview

A client-server based solution provides vendor-based services to remote customers. The solution is able to handle many different types of requests from client computers of the customer, and to do so without inadvertently negatively affecting the quality of service to that customer or any other customers. In addition, the solution helps ensure that the vendor meets the contractual agreements for each service level promised to each customer (e.g., a vendor may be able to ensure that its premier customers are prioritized over lower-level customers).

An embodiment of the present invention provides a way for a vendor to adaptively manage multiple different request types of polling, in an efficient manner that is tied closely to Service Level Agreements ("SLAs") based upon the support contracts purchased by customers. Exemplary methodology involves a protocol implemented between a software client and server, using dynamic polling rule sets existing on both the client and the server.

Embodiments of the invention also allow for SLA-based polling intervals and polling locations. The server side polling configuration update mechanism is connected to an entitlement service, so that the polling intervals that the server sends to a particular client are mapped according to the level of service that the client's owner or responsible party is entitled to obtain.

By allowing SLA-based polling, an exemplary system is better able to ensure that the customers who have contracted for better service receive better service, and provides a model that will inherently include the ability to simultaneously obtain funding as greater SLA levels (smaller polling intervals) are added. In addition, by dynamically adjusting the polling interval between a client program and server program based on activities performed by the client and server, communication between the client and server can be streamlined and optimized. Instead of many clients frequently polling the server and subsequently overloading it, just a few clients may be frequently polling the server while the rest of the clients are sparsely polling the server.

Illustrative Computing Environment

Figure 1:
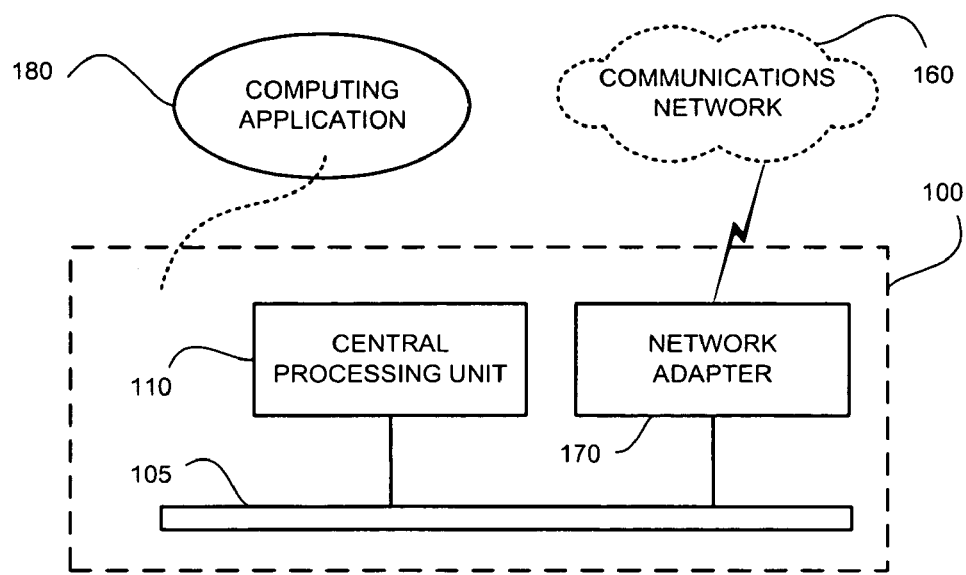
FIG. 1 is a block diagram of an exemplary computing environment in accordance with an implementation of the herein described systems and methods.

Referring to the drawings, in which like reference numerals indicate like elements, FIG. 1 depicts an exemplary computing system 100 in accordance with herein described systems and methods. The computing system 100 is capable of executing a variety of computing applications 180. Computing application 180 can comprise a computing application, a computing applet, a computing program and other instruction set operative on computing system 100 to perform at least one function, operation, and/or procedure. Exemplary computing system 100 is controlled primarily by computer readable instructions, which may be in the form of software. The computer readable instructions can contain instructions for computing system 100 for storing and accessing the computer readable instructions themselves. Such software may be executed within central processing unit (CPU) 110 to cause the computing system 100 to do work. In many known computer servers, workstations and personal computers CPU 110 is implemented by micro-electronic chips CPUs called microprocessors.

It is appreciated that although an illustrative computing environment is shown to comprise the single CPU 110 that such description is merely illustrative as computing environment 100 may comprise a number of CPUs 110. Additionally computing environment 100 may exploit the resources of remote CPUs (not shown) through communications network 160 or some other data communications means (not shown).

In operation, the CPU 110 fetches, decodes, and executes instructions, and transfers information to and from other resources via the computer's main data-transfer path, system bus 105. Such a system bus connects the components in the computing system 100 and defines the medium for data exchange. Components that may be connected to the system bus 105 include extension cards, controllers such as a peripherals controller and a memory controller, memory devices such as random access memory (RAM) and read only memory (ROM), and CPU 110.

Further, the computing system 100 may contain network adaptor 170 which may be used to connect the computing system 100 to an external communication network 160. The communications network 160 may provide computer users with connections for communicating and transferring software and information electronically. Additionally, communications network 160 may provide distributed processing, which involves several computers and the sharing of workloads or cooperative efforts in performing a task. It will be appreciated that the network connections shown are exemplary and other means of establishing a communications link between the computers may be used.

It is appreciated that the exemplary computer system 100 is merely illustrative of a computing environment in which the herein described systems and methods may operate and does not limit the implementation of the herein described systems and methods in computing environments having differing components and configurations as the inventive concepts described herein may be implemented in various computing environments having various components and configurations.

Illustrative Computer Network Environment

Figure 2:
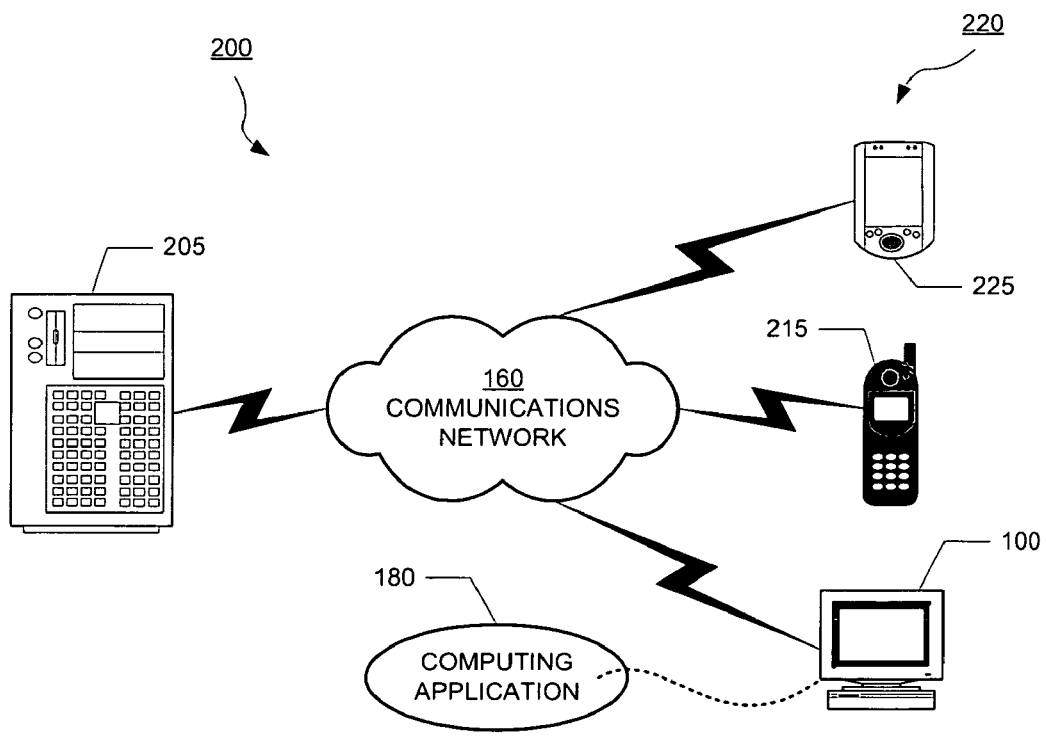
FIG. 2 is a block diagram showing the cooperation of exemplary components of an exemplary data communications architecture, in accordance with an embodiment.

Computing system 100, described above, can be deployed as part of a computer network. In general, the above description for computing environments applies to both server computers and client computers deployed in a network environment. FIG. 2 illustrates an exemplary illustrative networked computing environment 200, with a server in communication with client computers via a communications network, in which the herein described apparatus and methods may be employed. As shown in FIG. 2, server 205 may be interconnected via a communications network 160 (which may be either of, or a combination of a wired or wireless LAN, WAN, intranet, extranet, peer-to-peer network, the Internet, or other communications network) with a number of exemplary client computing environments such as personal computer 100, telephone 215 (such as a wired or mobile telephone), and personal digital assistant 225 (collectively client computing environments 220). In a network environment in which the communications network 160 is the Internet, for example, server 205 can be one or more dedicated computing environment servers operable to process and communicate data to and from exemplary client computing environments 220 via any of a number of protocols, such as hypertext transfer protocol (HTTP), file transfer protocol (FTP), simple object access protocol (SOAP), wireless application protocol (WAP), etc. Each exemplary client computing environment 220 can be equipped with browser operating system 180 operable to support one or more computing applications to gain access to server computing environment 205.

In operation, a user (not shown) may interact with a computing application running on a client computing environment to obtain desired data and/or computing applications. The data and/or computing applications may be stored on server computing environment 205 and communicated to cooperating users through exemplary client computing environments 220, over exemplary communications network 160. Server computing environment 205 may host computing applications, processes and applets for the generation, authentication, encryption, and communication of web services and may cooperate with other server computing environments, service providers, or storage providers (not shown), to realize such web services transactions.

Illustrative Vendor-Customer Environments

Figure 3A:
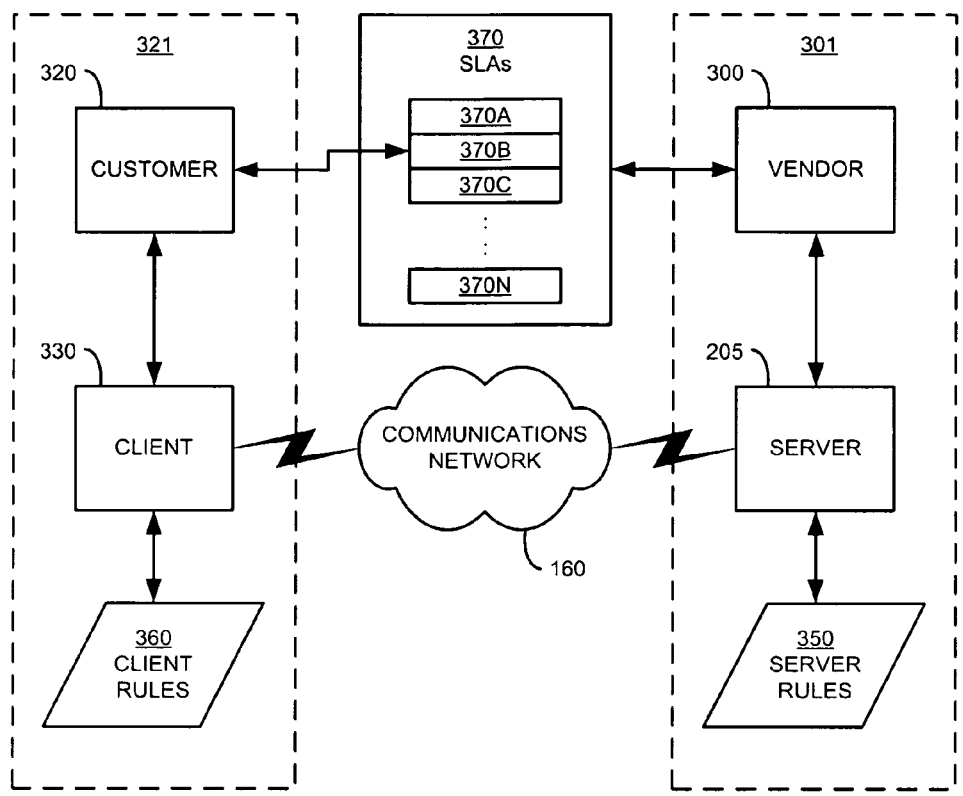
FIG. 3A is a diagram illustrating a relationship between components of an exemplary vendor environment and customer environment for practicing an embodiment of the invention.

FIG. 3A depicts an illustrative relationship between components of an exemplary vendor environment 301 and customer environment 321 for practicing an embodiment of the invention. The vendor environment 301, which includes a server 205, is controlled or operated by a vendor 300. The vendor 300 may, for example, be a person or business entity that uses the server 205 to provide services to a customer 320.

The customer environment 321, which includes a client 330, is controlled or operated by the customer 320. Examples of client 330 include client computing environments 220. The client 330 and server 205 are able to communicate using the communications network 160.

The vendor 300 may offer one or more levels of service to customer 320, embodied in a service level agreement (SLA) 370A, 370B, 370C . . . 370N (collectively, SLAs 370). An SLA 370 may, for example, represent terms of a contract, agreement, commitment, or the like, or the SLA 370 may represent a non-contractual goal or target. The customer 320 is associated with one of the SLAs 370. For example, the customer 320 may be able to select among available SLAs 370 offered by vendor 300; for example, in the illustration, an exemplary customer 320 has selected SLA 370B. In some implementations, an SLA 370 may be provided without charge to a customer 320. More typically, a variety of SLAs 370 may be offered commercially by the vendor 300, at prices that generally increase as the vendor 300 commits to providing increased levels of service to the customer 320. Increased levels of service may, for example, be reflected in improved performance of the server 205, or improved communications between client 330 and server 205, as measured by any one or more of numerous metrics that will be apparent to one skilled in the art.

The customer 320 and the vendor 300 are generally separate persons or business entities; however, customer 320 and vendor 300 may in some cases be identical. For example, in some embodiments, a vendor 300 may elect to establish a customer environment 321 for internal use of the vendor 300; for example, the vendor 300 may establish internal service levels for an internal client 330. Such internal service levels would correspond to an SLA 370, and would be applicable to the internal client 330 as though the client 330 were operated by an outside customer 320. In further embodiments, customer 320 and vendor 300 may each represent a user, person, department, division, business unit, internal customer, other organizational unit of a common entity or of separate entities, etc.

The server 205 maintains a set of server rules 350, and the client 330 maintains a set of client rules 360. Client rules 360 and server rules 350 may be identical; however, the client rules 360 typically include a subset of the server rules 350 selected according to the applicable SLA 370 for the customer 320. The rule sets 350, 360 are versioned, such as by including a version number that may permit one of the rule sets 350, 360 to be identified as more recent or less recent than the other of the rule sets 350, 360.

Client rules 360 and server rules 350 may be maintained in databases, data structures, or files of any kind. In some embodiments, it may be desired to maintain the client rules 360 in an encrypted format in order to prevent the customer 320 from modifying the contents of the client rules 360.

Figure 3B:
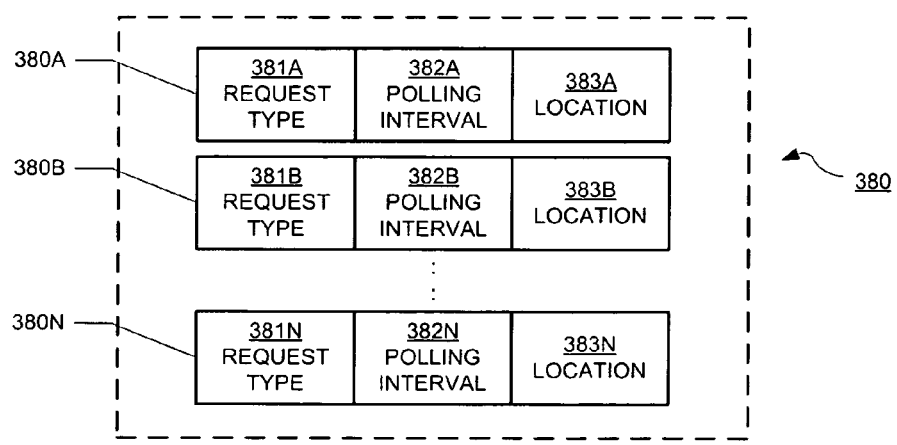
FIG. 3B depicts components included in an exemplary rule set for an embodiment of the invention.

FIG. 3B depicts components included in an exemplary rule set 380 for an embodiment of the invention. The rule set 380 may, for example, be a set of client rules 360 or a set of server rules 350. The rule set 380 includes rules for dynamic polling, such as rules 380A, 380B, . . . , 380N.

An exemplary rule set 380 may include rules for one or more request types 381A, 381 B, . . . , 381 N (collectively, request types 381). Such rules may include detailed information for one or more polling intervals 382A, 382B, . . . , 382N (collectively, polling intervals 382) and polling locations 383A, 383B, . . . , 383N (collectively, polling locations 383). A polling location 383 may, for example, be expressed in the form of a Uniform Resource Locator ("URL").

The polling intervals 382 may be adjustable based upon one or more state values reflecting the state of the client 330 or the server 205, such as a server status value reflecting the extent to which the server 205 may be overloaded.

Embodiments of the present invention allow for the client 330 and server 205 to simultaneously maintain distinct polling intervals 382 and distinct polling locations 383 for different polling request types 381. For example, a rule set 380 may include a request type 381 for a message 410 (as discussed below with reference to FIG. 4) requesting general configuration updates, which the client 330 sends to the server 205 periodically (e.g., every week). In a further example, there may be a specific request type 381 for use with a message 410 requesting SLA updates that occur periodically (e.g., every month)—for example, in a case where the client 330 is providing the front-end to a vendor service that requires support-contract-based entitlement, and the client user interface needs to periodically be updated to reflect the status of the entitlement. In yet another example, there may be a request type 381 for use with a message 410 requesting that the client 330 may check periodically (e.g., every five minutes) to see if a recently submitted request for specific information on a submitted customer request has an update.

In some embodiments, the rule set 380 may be represented in XML (eXtensible Markup Language) or the like. Table 1 is an exemplary framework, represented in XML-like pseudocode, for a rule set 380 for polling, which may be a set of client rules 360 or server rules 350. While the example of Table 1 illustrates only two polling locations 383 and three request types 381, any number of polling locations 383 and request types 381 may be included in an implementation of a polling rule set 380.

TABLE 1

```
<poll-manager version="0.1.2">
    <locations>
        <location id="loc-1" mechanism="soap">https://someUrl1
</location>
        <location id="loc-2" mechanism="soap">https://someUrl2
</location>
    </locations>
    <request-types>
        <request id="req-1">
            :
        </request>
        <request id="req-2">
            :
        </request>
        <request id="req-3">
            :
        </request>
    </request-types>
</poll-manager>
```

Table 1 shows exemplary pseudocode for a polling manager rule set 380, in which a first section, tagged "locations", defines two polling locations 383, and a second section, tagged "request-types", defines three request types 381. Each polling location 383, tagged "location", defines values for an identifier, a mechanism, and a location (such as an URL). Each request type 381, tagged "request", defines values for an identifier and additional information (not shown).

Table 2 is an exemplary implementation of a request for a general configuration update, represented in XML-like pseudocode, that may be included in an implementation of a polling rule set 380.

TABLE 2

```
<request id="general-config-update">
    <basic-poll-settings>
        <strategy>recurring</strategy>
        <temporary-override-allowed>false</temporary-override-
        allowed>
        <initial-interval measurement="days">7</initial-interval>
        <initial-location ref-id="loc-1"/>
    </basic-poll-settings>
    <service-level-agreement-adjustments>
        <service-level-agreement id="basic-support">
            <server-status id="normal">
                <poll-adjustment type="none"/>
            </server-status>
            <server-status id="overloaded">
                <poll-interval-adjustment type="multiplier">2
                </poll-interval-adjustment>
                <poll-location-adjustment ref-id="loc-2"/>
            </server-status>
        </service-level-agreement>
        <service-level-agreement id="advanced-support">
            <server-status id="normal">
                <poll-adjustment type="divisor">2</poll-adjustment>
            </server-status>
            <server-status id="overloaded">
                <poll-adjustment type="multiplier">1</poll-
                adjustment>
            </server-status>
        </service-level-agreement>
    </service-level-agreement-adjustments>
</request>
```

Table 2 shows exemplary pseudocode for a request for a general configuration update, in which a first section, tagged "basic-poll-settings", defines values for a strategy, a temporary override, an initial interval 382, and an initial polling location 383. A second section, tagged "service-level-agreement-adjustments", defines SLA adjustments that are applicable to two exemplary service level agreements 370, tagged "service-level-agreement".

As illustrated by the example in Table 2, an implementation of a request for a general configuration update may include initial, default, or basic poll settings. Such basic poll settings will typically include, for example, an initial polling interval 382 and an initial polling location 383. Such basic poll settings may also include a polling strategy, and an indication of whether settings may be temporarily overridden by the client.

An implementation of a request for a general configuration update may also include SLA adjustments that are applicable to one or more exemplary service level agreements 370. In the example shown in Table 2, two service level agreements 370 are shown, using the exemplary identifiers "basic-support" and "advanced-support." However, any number of service level agreements 370 may be implemented in an embodiment of the invention.

The implementation of each of the SLA adjustments in the exemplary pseudocode shown in Table 2 reflects an adjustment to the polling interval 382, such as a mathematical adjustment using a specified multiplier, divisor, or the like. An SLA adjustment may be made based upon a state value, such as a server status indicative of a condition of the server 205. In the example shown in Table 2, the server status uses the exemplary identifiers "normal" or "overloaded," reflecting a load condition of the server 205. However, any number of state values, indicative of any number of conditions, may be implemented in an embodiment of the invention.

Table 3 is an exemplary implementation of a request for a service level agreement update, represented in XML-like pseudocode, that may be included in an implementation of a polling rule set 380.

TABLE 3

```
<request id="service-level-agreement-update">
    <basic-poll-settings>
        <strategy>recurring</strategy>
        <temporary-override-allowed>true</temporary-override-
        allowed>
        <initial-interval measurement="days">30</initial-interval>
        <initial-location ref-id="loc-1"/>
    </basic-poll-settings>
</request>
```

Table 3 shows exemplary pseudocode for a request for a service level agreement update, in which a section tagged "basic-poll-settings" defines values for a strategy, a temporary override, an initial interval 382, and an initial polling location 383.

Table 4 is an exemplary implementation of an illustrative service request, represented in XML-like pseudocode, that may be included in an implementation of a polling rule set 380.

TABLE 4

```
<request id="service-request">
    <basic-poll-settings>
        <strategy>terminate-upon-completion</strategy>
        <temporary-override-allowed>true</temporary-override-
        allowed>
        <initial-interval measurement="minutes">5</initial-interval>
        <initial-location ref-id="loc-1"/>
    </basic-poll-settings>
    <service-level-agreement-adjustments>
        <service-level-agreement id="basic-support">
            <server-status id="normal">
                <poll-adjustment type="multiplier">2</poll-
```

TABLE 4-continued

```
                adjustment>
            </server-status>
            <server-status id="overloaded">
                <poll-interval-adjustment type="multiplier">4
                </poll-interval-adjustment>
                <poll-location-adjustment ref-id="loc-2"/>
            </server-status>
        </service-level-agreement>
        <service-level-agreement id="advanced-support">
            <server-status id="normal">
                <poll-adjustment type="none"/>
            </server-status>
            <server-status id="overloaded">
                <poll-adjustment type="multiplier">2</poll-
                adjustment>
            </server-status>
        </service-level-agreement>
    </service-level-agreement-adjustments>
</request>
```

Table 4 shows exemplary pseudocode for a request for a service level agreement adjustment, in which a first section, tagged "basic-poll-settings", defines values for a strategy, a temporary override, an initial interval 382, and an initial polling location 383. A second section, tagged "service-level-agreement-adjustments", defines SLA adjustments that are applicable to two exemplary service level agreements 370, tagged "service-level-agreement".

Request and Response

Figure 4:
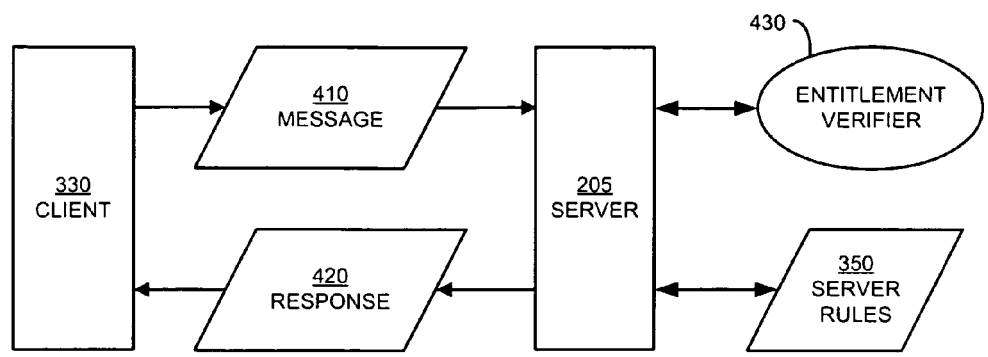
FIG. 4 is a diagram illustrating data flow between client and server for an embodiment of the invention.

FIG. 4 is a diagram illustrating a flow of data between client 330 and server 205. When the client 330 polls the server 205, the client 330 sends a message 410 to the server 205. The server 205 receives and may in some embodiments record information contained in message 410, and sends a response 420 to the client 330.

If the message 410 is valid, the response 420 transmitted by the server 205 will generally be responsive to the message 410; for example, the response 420 may be designed to be responsive to a specific request type identifier included in the message 410. The response 420 may include a state value, such as a server status indicative of a condition of the server 205.

The server 205 is able to query an entitlement verifier 430. The entitlement verifier 430 is able to determine the validity of the SLA identifier 530 for the customer 320, such as by querying a customer support database. The entitlement verifier 430 may in some embodiments be able to use the server rules 350. If the entitlement verifier 430 determines that the customer 320 is not entitled to receive a level of services associated with SLA identifier 530, the server 205 may respond in a variety of ways, such as by causing an email notification to be sent to the customer 320, or by simply returning a response 420 indicating that an error has occurred. In addition, the server 205 may be able to report the violation to the vendor 300, such as by generating a violation report or an automated email.

Figure 5A:
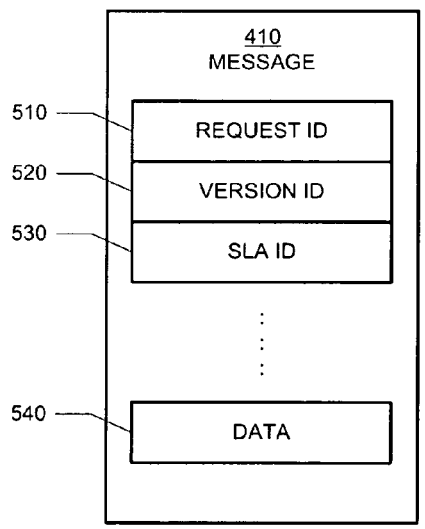
FIG. 5A depicts components included in an exemplary message for an embodiment of the invention.

FIG. 5A depicts components included in an exemplary message 410 for an embodiment of the invention. An exemplary message 410 may, for example, include a request type identifier 510, a version identifier 520, and an SLA identifier 530. The message 410 may in some embodiments include additional data, such as data 540, that may be useful to the server 205 for processing the message 410. Data 540 may, for example, include one or more values representing a current state or status of the client 330.

The request type identifier 510 may, for example, be a name, number, or other type of identifier associated with a request type 381. The request type identifier 510 represents a reason why the client 330 is polling the server 205. Examples of such reasons may include a request for a general configuration update, a request for a service level agreement update, a service request, and the like. Numerous other reasons and request types may be accommodated by embodiments of the present invention.

The version identifier 520 of the message 410 may identify a version number associated with the client rule set 360. In some embodiments, the server 205 may compare the version identifier 520 to a version number associated with the server rule set 350. If such a comparison indicates that the client 330 has an outdated version of the client rules 360, the response 420 may include an updated version of the client rules 360.

The SLA identifier 530 of the message 410 allows the server 205 to identify the SLA 370 under which the client 330 is currently operating, such as an SLA 370 that the customer 320 has selected. The SLA identifier 530 may be, for example, a contract identifier or customer number associated with the customer 320. In other embodiments, the SLA identifier 530 may be a numeric value within a range from a lowest level of support (or no support) to a best or maximum level of support. In further embodiments, the SLA identifier 530 may represent a marketing segment associated with the customer 320, or another value that may be associated by the server 205 with a specific level of support.

The SLA identifier 530 may be used by the server 205 for a variety of purposes. For example, a server 205 may include a feature capable of allowing the server 205 to refuse requests from a client 330 or customer 320 that is violating the applicable SLA 370 associated with the SLA identifier 530. The SLA identifier 530 may also be used by the server 205 to query the entitlement verifier 430.

In further embodiments of message 410, the message 410 may contain a consolidated poll request. That is, it is possible for specific requests, each identified by a request type identifier 510, to be grouped into a single instance of a message 410, such as a message 410 containing a consolidated poll request having a plurality of request type identifiers 510. For example, it may be desired to implement, in a single message 410, a master general configuration request that is made up of sub-requests (such as an SLA update and a rule set update). In such embodiments, the specific sub-requests may be grouped into a single message 410 to the server, resulting in benefits such as reducing individual network traffic and minimizing the number of incoming messages 410 to the server 205. Meanwhile, other service requests that need immediate attention would still be able to be submitted independently, each in a single message 410, and thereby maintain distinct polling intervals 382 and distinct polling locations 383 so that each message 410 would have lower overhead than a message 410 with a consolidated poll request, and may cause less likelihood of a delay due to an error on the server 205. An error on the server 205 may be more likely, in some implementations, during processing of a consolidated poll request simply because of the additional time required to process a consolidated poll request, compared to a message 410 having a single request type identifier 510. Inherently, the additional time may modestly increase the chance that an error on the server 205 would occur during servicing of the plurality of sub-requests.

If desired, a message 410 containing a consolidated poll request could also be dynamically adjusted into a plurality of messages 410 each having a single request type identifier 510, based upon factors that may include the applicable SLA 370 for the customer 320, and/or one or more state values, such as a server status indicative of a condition of the server 205, or a client status indicative of a condition of the client 330.

Figure 5B:
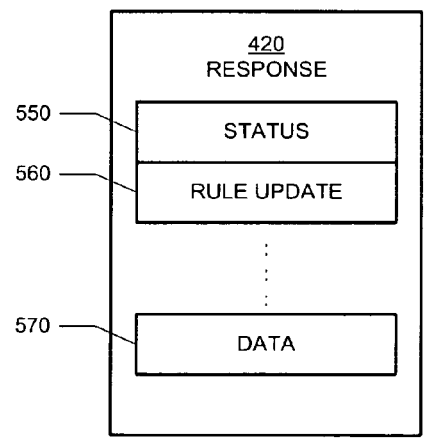
FIG. 5B depicts components included in an exemplary response for an embodiment of the invention.

FIG. 5B depicts components included in an exemplary response 420 for an embodiment of the invention. An exemplary response 420 may, for example, include a state value, such as a server status 550. Where appropriate, a response 420 may include a rule update 560 for updating the client rules 360. The response 420 may in some embodiments include additional data, such as data 570, that may be useful to the client 330 for processing the response 420.

Exemplary Method

Figure 6:
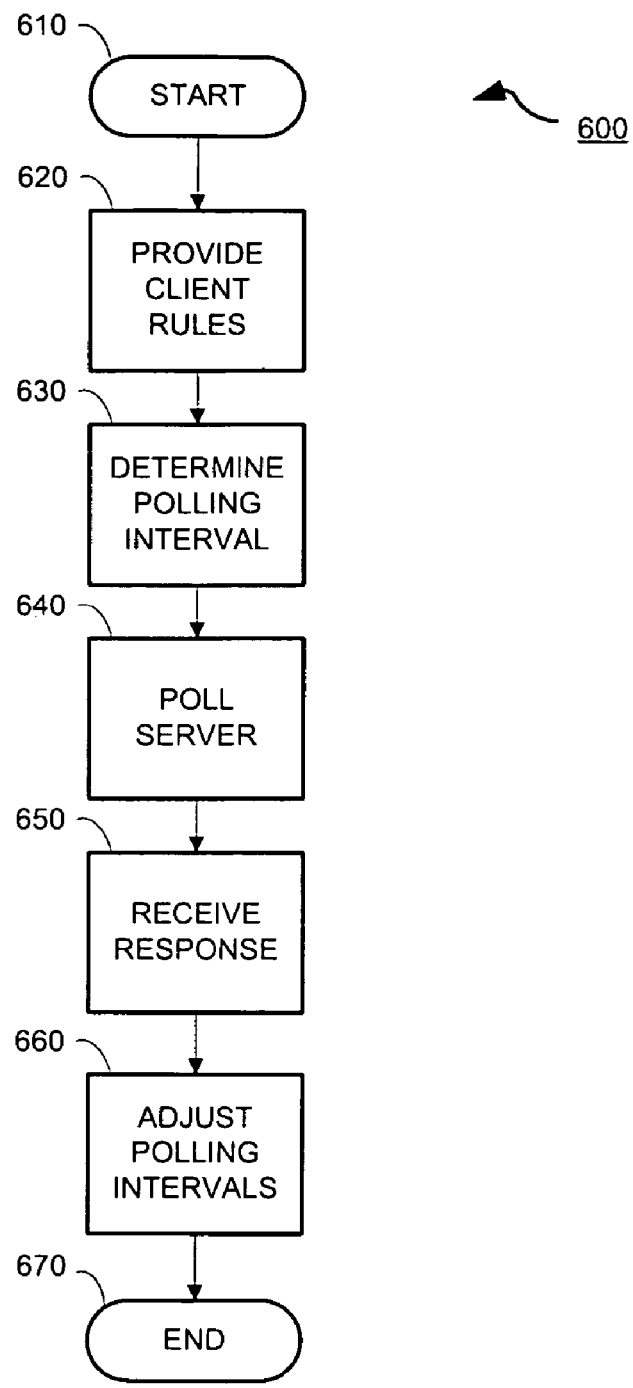
FIG. 6 is a flow chart of a method for adaptive polling according to an embodiment of the present invention.

FIG. 6 shows a method 600 for adaptive polling according to an embodiment of the present invention. The method 600 begins at start block 610, and proceeds to block 620.

At block 620, the client rules 360 are provided. For example, client rules 360 may be associated with a service level selected according to the applicable SLA 370 for the customer 320.

At block 630, using the client rules 360, the client 330 determines a polling interval 382. For example, if the client 330 is preparing to send a message 410 to the server 205, the client 330 may consult the client rules 360 to determine the polling interval 382 that is associated with a request type 381 corresponding to the request identifier 510 of the message 410.

At block 640, the client 330 polls the server 205, such as by sending message 410 to the server 205 through the communications network 160. The server 205 receives the message 410 through the communications network 160. In some embodiments, the server 205 may also record all or a portion of the information contained in the message 410.

At block 650, the client 330 receives a response 420 to the message 410 from the server 205. For example, the server 205 may transmit the response 420 to the client 330 through the communications network 160.

At block 660, the client 330 may adjust one or more polling intervals 382. Such an adjustment may be an adjustment suggested by the server 205 in the response 420, or may be a dynamic adjustment.

A suggested adjustment to a polling interval 382 may be included in the response 420. For a given rule set 380, every one of the request types 381 is capable of maintaining a distinct polling interval 382 and a distinct polling location 383, based upon a state value such as the server status 550 included in the response 520 from the server 205. Thus, in an illustrative example, the server 205 is able to send a response 520 that includes a rule update 560 changing the polling interval 382 for a general configuration update, so as to make a general configuration update a weekly occurrence, while still allowing a monthly SLA check to still occur monthly and the customer-submitted request to occur every five minutes. Such a rule update 560 could be transmitted to the client 330, for example, in a response 420 to the next message 410 received from the client 330 that has a request type 381 corresponding to a general configuration update request.

Additionally, a dynamic adjustment to a polling interval 382 may be performed, regardless of whether a response 520 has suggested such an adjustment. For example, the client 330 may dynamically adjust a polling interval 382 for a request type 381. In a dynamic adjustment, the client 330 typically consults its version of the client rules 360 and the latest known state of the server, such as server status 550. For example, if the client 330 sends information to the server 205 and expects a quick response 520 from the server 205 in a short time interval (which is known by consulting the client rule set 360), the client 330 can increase its polling frequency (i.e., decrease the applicable polling interval 382) to the server 205 until the client 330 has received the expected response 420. After receiving the expected response 420, the client 330 can again consult its rules 360 to adjust the polling interval 382 back to a longer time period.

Dynamic adjustment capabilities, whether on the server 205 or on the client 330, may be provided to control the various polling intervals 382 to varying degrees. For example, software events may be mapped against a pre-configured rule set 380 to dynamically adjust the polling intervals 382 based on events occurring, and based on the status of the server 205 or client 330. An exemplary implementation of event mapping, in XML-like pseudocode, is shown in Table 5 below.

TABLE 5

```
<event-map>
    <event id="application-fault-detected" request="service-request"
invokeImmediateOverride="false"/>
    <event id="service-level-agreement-input" request="service-level-
agreement-update" invokeImmediateOverride="true"/>
</event-map>
```

Table 5 shows exemplary pseudocode for a request for an event mapping implementation, tagged "event-map", which defines two events, each having an identifier, an association with a request type 381, and a boolean value for whether an immediate override is to be invoked.

In addition to changes or updates to the configuration rule sets 380, both the client rules 360 and server rules 350 can be temporarily overridden, such as by an administrator, to adjust a polling interval 382. For example, if the client 330 is providing a front-end to a service of the vendor 300, and the client 330 has sent a request to the vendor 300 that is only set to poll every 30 minutes, then the customer 320 administering the client 330 may desire to speed the process along for a particular message 410 by requesting a one-time immediate update poll for the original message 410. This would cause the client 330 to ignore its normal polling interval 382 (without making any changes to the actual polling interval 382) and immediately poll the server 205 for an update. On the server 205 side, a software event that ordinarily justifies short polling intervals 382 may be temporarily overridden for a specific client 330 or set of clients 330, such as if the vendor 300 determines that the resolution time for that software event will be delayed for some reason.

After any such adjustments have been made to polling intervals 382, the method 600 concludes at block 670.

Although exemplary implementations of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A method for a client computer communicatively coupled to a server computer to adjust a polling interval at which the client polls the server, comprising the following computer-implemented steps:

providing a server rule set associated with a service level,
providing to the client a client rule set maintained by the client and associated with the service level,
determining, based upon the client rule set, a polling interval for a request type,
providing by the client a message comprising a service level identifier associated with the client and with the request type,
polling the server with the message in accordance with the polling interval,
receiving the message by the server,
providing a response by the server comprising a state of the server,
receiving by the client the response from the server, and
adjusting the polling interval based at least upon the client rule set and the state of the server.

2. The method of claim 1 wherein the client rule set comprises at least a subset of the server rule set.

3. The method of claim 1 wherein adjusting the polling interval is performed based at least upon a portion of the response.

4. The method of claim 1 wherein adjusting the polling interval comprises mapping a software event against the client rule set.

5. The method of claim 1, further comprising mapping the polling interval to a service level associated with the client.

6. The method of claim 1, further comprising determining whether a customer associated with the client is entitled to receive a level of services associated with the service level identifier, and if not, providing a notification.

7. A system having a client computer communicatively coupled to a server computer to adjust a polling interval at which the client polls the server, comprising:

the server enabled to receive from the client a message comprising a service level identifier associated with the client and with a request type,
a server rule set maintained by the server, comprising at least one rule for the request type, wherein the at least one rule is associated with a service level,
the server being adapted to send a response comprising a state of the server to the client responsive to the message, and
the client being provided with a client rule set maintained by the client and associated with the service level, the client being adapted to receive the response and adjust its polling interval based at least upon the client rule set and the state of the server.

8. The system of claim 7 wherein the response comprises information for adjusting one or more polling intervals of the client.

9. The system of claim 7 further comprising a service level agreement for associating the client with the service level.

10. The system of claim 7 wherein the server is operated by a vendor and the client is operated by a customer of the vendor.

11. The system of claim 7 wherein the at least one rule comprises information for one or more polling intervals associated with the request type.

12. The system of claim 7 wherein the at least one rule comprises information for one or more polling locations associated with the request type.

13. The system of claim 7 wherein the message comprises a plurality of service level identifiers.

14. The system of claim 7 wherein the response further comprises a rule update for updating the client rule set of the client.

15. The system of claim 7 wherein the server further comprises an entitlement verifier.

16. A computer-readable storage medium containing a set of instructions for a client computer communicatively coupled to a server computer to adjust a polling interval at which the client polls the server, the set of instructions comprising steps for:

providing a server rule set associated with a service level, providing to the client a client rule set maintained by the client and associated with the service level, determining, based upon the client rule set, a polling interval for a request type, providing by the client a message comprising a service level identifier associated with the client and with the request type, polling the server with the message in accordance with the polling interval, receiving the message by the server, providing a response by the server comprising a state of the server, receiving by the client the response from the server, and adjusting the polling interval based at least upon the client rule set and the state of the server.

17. The computer-readable medium of claim 16 wherein the client rule set comprises at least a subset of the server rule set.

18. The computer-readable medium of claim 16 wherein adjusting the polling interval is performed based at least upon a portion of the response.

19. The computer-readable medium of claim 16 wherein adjusting the polling interval comprises mapping a software event against the client rule set.

20. The computer-readable medium of claim 16, wherein the set of instructions further comprises steps for:

determining whether a customer associated with the client is entitled to receive a level of services associated with the service level identifier, and if not, providing a notification.

21. A system having a client computer communicatively coupled to a server computer to adjust a polling interval at which the client polls the server, comprising:

a server rule set associated with a service level, a client rule set maintained by the client associated with the service level, means for determining, based upon the client rule set, a polling interval for a request type, means for providing by the client a message comprising a service level identifier associated with the client and with the request type, means for polling the server with the message in accordance with the polling interval, means for receiving the message by the server, means for providing a response by the server comprising a state of the server, means for receiving by the client response from the server, and means for adjusting the polling interval based at least upon the client rule set and the state of the server.

\* \* \* \* \*